(12) United States Patent
Vu

(10) Patent No.: US 7,246,350 B2
(45) Date of Patent: Jul. 17, 2007

(54) DYNAMIC COMPOSITION AND MAINTENANCE OF APPLICATIONS

(75) Inventor: Victor N. Vu, Oceanside, CA (US)

(73) Assignee: Intel Corporation, Santa Clara, CA (US)

( * ) Notice: Subject to any disclaimer, the term of this patent is extended or adjusted under 35 U.S.C. 154(b) by 695 days.

(21) Appl. No.: 10/040,654

(22) Filed: Jan. 7, 2002

(65) Prior Publication Data
US 2003/0131153 A1    Jul. 10, 2003

(51) Int. Cl.
*G06F 9/445* (2006.01)

(52) U.S. Cl. .................. 717/171; 719/331; 709/203; 709/219

(58) Field of Classification Search ........ 719/331–332, 719/310–320, 328; 709/200–203, 217–219, 709/225, 231; 707/10, 103 R; 717/168–178
See application file for complete search history.

(56) References Cited

U.S. PATENT DOCUMENTS

| | | | |
|---|---|---|---|
| 5,369,766 A * | 11/1994 | Nakano et al. ............. | 719/332 |
| 5,761,499 A * | 6/1998 | Sonderegger ................. | 707/10 |
| 6,332,163 B1 * | 12/2001 | Bowman-Amuah ......... | 709/231 |
| 6,434,568 B1 * | 8/2002 | Bowman-Amuah ..... | 707/103 R |
| 6,438,594 B1 * | 8/2002 | Bowman-Amuah ......... | 709/225 |
| 6,615,253 B1 * | 9/2003 | Bowman-Amuah ......... | 709/219 |
| 6,640,238 B1 * | 10/2003 | Bowman-Amuah ......... | 709/201 |
| 2003/0110312 A1 * | 6/2003 | Gunduc et al. ............. | 719/328 |

OTHER PUBLICATIONS

PCT/US 03/00113, International Search Report, 10 pages.
"The Open Services Gateway Initiative", "OSGi Service Platform Release 2-Chapter 2 Framework Specification" Online!, Oct. 2001 (2001-10), pp. I-III, 11-92, retrieved from the internet: URL: http//jeffree.objectweb.org/doc/spr2b. retrieved on Nov. 17, 2004.
"Process for Dynamic Upgrade of an Object", Nov. 1, 1995 (Nov. 1, 1995), IBM Technical Disclosure Bulletin, IBM Corp. New York, US, pp. 385, XP000547402. ISSN 0018-8689.
Condry M. et al., "Open Service Gateway Architecture Overview", Industrial Electronics Society, 1999. IECON'99 Proceedings. The 25th Annual Conference of the IEEE San Jose, CA, USA, Nov. 29-Dec. 3, 1999., Piscataway, NJ USA, IEEE, US, ISBN: 0-7803-5735-3, dated Nov. 29, 1999 (Nov. 29, 1999).
Plasil F et al., Sofa/Dcup: Architecture for component trading and dynamic updating: CONFIGURABLE DISTRIBUTED SYSTEMS, 1998. PROCEEDINGS. FOURTH INTERNTIONAL CONFERENCE ON ANNAPOLIS, MA., USA, May 4-6, 1998, Los Alamitos, CA., USA, IEEE, Comput. Soc. US, May 4, 1998, (May 4, 1998) pp. 43-51, XP010280578, ISBN: 0-8186-8451-8.

(Continued)

*Primary Examiner*—Lewis A. Bullock, Jr.
(74) *Attorney, Agent, or Firm*—Blakely, Sokoloff, Taylor & Zafman LLP

(57) ABSTRACT

An application can be dynamically composed and maintained by creating the application within a component framework. The component framework includes components that each implement an integration interface. The integration interface has a number of methods that allow the component framework to manage the lifetime of the component, and which give the component the ability to communicate with the component framework, other components, and external entities.

13 Claims, 21 Drawing Sheets

OTHER PUBLICATIONS

Bramley Randall, Gannon Dennis, Villacis Juan, Whitakery Andrew: "Using the Grid to Support Software Component Systems", Ninth SIAM Conference on Parallel Processing for Science Computing Mar. 22-24. 1999, San Antonio, TX, US. Online, Mar. 1999 (Mar. 23, 1999), pp. 1-11 Xp002306196, retrieved from internet,http.//www.extreme.indiana.edu/cat/papers/siam99.pdf.

Villacis J. et al., "CAT: a high performance, distributed component architecture toolkit for the grid", High Performance Distributed Computing 1999. Proceedings. The Eighth International Symposium on Redondo Beach, CA, USA Aug. 3-6, 1999, Los Alamitos, CA, Aug. 3, 1999 (Aug. 8, 1999) pp. 125-132 XP010358677 ISBN: 0-7803-5681-0.

* cited by examiner

```
1   /*The _CompFrameworkInterface contains interface for communications between
2    * the component framework and the components. The component framework uses this
3    * data structure to manage and communicate with components. The components use this
4    * data structure to publish and/or remove communication interfaces. Also, the components use
5    * this data structure to register listeners that listen to supported events (see below).
6    * The components initalize the following members when this structure is declared:
7    *   1) getName
8    *   2) getVersion
9    *   2) init
10   *   4) replace
11   *   5) run
12   *   6) stop
13   *
14   * The component framework initializes the following members when it retrieves
15   * a pointer to an instance of this structure from the components:
16   *   1) publish
17   *   2) remove
18   *   2) retrieve
19   *   4) addListener
20   *   5) removeListener
21   */
22  typedef struct _CompFrameworkInterface {
```

*FIG. 2A*

```
1    /*------------------------------------------------*
2    ** IDENTIFICATION AND VERSIONING OF COMPONENTS *
3    **------------------------------------------------*
4    ** Components must initialize these two members when   *
5    ** an instance of this structure is declared.          *
6    **------------------------------------------------*/
7    /*
8     * const char* getName(void) - Returns the name of the component.
9     * The component framework uses this method to identify and manage the component.
10    */
11   const char* (*getName)(void);
12   /*
13    * const char* getVersion(void) - Returns the version of this component. The component
14    * framework uses this method to identify and to manage the component.
15    */
16   const char* (*getVersion)(void);
17
18
```

FIG. 2B

```
1   /*-------------------------------------------------------*
2   ** LIFETIME MANAGEMENT OF COMPONENTS             *
3   **------------------------------------------------------*
4   ** Components must initialize these two members when    *
5   ** an instance of this structure is declared.           *
6   **-----------------------------------------------------*/
7   /*
8    * init(void *initData) - This function shall be invoked by the
9    * component framework to give the component a chance to initialize.
10   *
11   * INPUT:
12       * initData - Points to the data a component uses to initialize itself.  If this argument
13       * is NULL, no data available.  The initData argument is generally available when one
14       * component replaces another component. The initData comes from the 'to be replaced
15       * component' via the replace() function.
16       * Return:
17       *    0 - Success
18       *    -n - Error code
19   */
20  int (*init)(void* initData);
21  /*
22    replace(void) - This function shall be invoked by the component framework to notify a
```

*FIG. 2C*

```
1    * running component that it is being replaced by another component. The running component
2    * must either return a NULL pointer or a pointer to the data that the new component uses
3    * to initialize itself. The type of the returned data is upto the components to comprehend.
4    * The component framework does not dictate any types.
5    *
6    * Here is how the replacement of component process works:
7    *   1) The component framework receives a "Replace" command.
8    *   2) The component framework invokes the replace() function of the to-be-replaced
9    *      component.
10   *   2) The to-be-replaced component returns a pointer (can be NULL) to the data that is
11   *      used by the new component to initialize itself.
12   *   4) The component framework invokes the init() functions of the new component passing
13   *      it the returned pointer.
14   *   5) The component framework invokes the stop() function of the to-be-replaced
15   *      component.
16   *   6) 100 milliseconds after the invocation of the stop() function, the component framework
17   *      invokes the run() function of the new component
18   *   7) The component framework generates a COMPONENT_STOPPED event.
19   *   8) The component framework generates a COMPONENT_STARTED event.
20   *
21   * INPUT:
22   *   initData - Points to the data a component uses to initialize itself. If this argument is
```

*FIG. 2D*

```
1    *  NULL, no data available. The initData argument is generally available when one
2    * component replaces another component. The initData comes from the 'to be replaced
3    * component' via the replace() function.
4    * Return:
5    *   0 - Success
6    *  -n - Error code
7    */
8    void* (*replace)(void);
9    /*
10   * run(void *anyData) - This function shall be invoked by the component framework to
11   * indicate that it is now safe for the component to perform normal processing.
12   *
13   * This function is conceptually equivalent to the main() function in procedural programming.
14   * This run() function is called ONCE by the component framework.
15   *
16   * INPUT:
17   *  argc - The number of command line arguments.
18   *  argv - The command line arguments. It is safe for components to keep a pointer to this
19   *   list of arguments. Note: DO NOT deallocate/free the memory used by this argument.
20   *
21   * Return:
22   *   0 - Success
```

*FIG. 2E*

```
1   *  -n - Error code
2   */
3   int (*run)(int argc, char** argv);
4   /*
5   stop(void) - This function shall be invoked by the component framework when it receives a
6   * Stop Component, Stop All or Shutdown command.  This method is also invoked when the
7   * framework is about to shutdown regardless of reasons.
8   *
9   * Return:
10  *   0 - Success
11  *  -n - Error code
12  */
13  int (*stop)(void);
14
15
16
```

*FIG. 2F*

```
1   /*----------------------------------------------------------------*
2   ** COMMUNICATION INTERFACE PUBLICATION AND RETRIEVAL    *
3   **---------------------------------------------------------------*
4   ** The publish() and retrieve() members (pointer to functions) are used by components for
5   ** inter-component communications. The producer components use the publish() function
6   ** to publish or circulate one or more communication interfaces for other components to use.
7   ** The consumer components retrieve the published interfaces via the retrieve() function.
8   ** The remove() function is the reverse of the publish() function. That is, to remove or
9   ** a published interface.
10  **
11  ** The component framework initializes the three member functions below
12  ** immediately after a pointer of this data structure (CompFrameworkInterface)
13  ** is retrieved from a component. component framework initializes:
14  **   1) publish   2) retrieve   2) remove
15  **
16  ** Components must initialize the above three members to NULL when initialize this data
17  ** structure while declaring it. Otherwise, just leave them alone until they are ready for uses
18  ** (see below).
19  **
20  ** Components can invoke these three functions after or during the init() function
21  ** (the init member) is invoked. The system will CRASH if these publish(), retrieve(),
22  ** and remove() functions are invoked before the invocation of the init() function.
```

*FIG. 2G*

```
1    ** The component framework invokes the init() function.
2    **----------------------------------------------------------*/
3    /*
4     * publish() is used by the producer component to publish/publish an interface for consumer
5     * components to retrieve and communicate with it.  The producer component can remove
6     * that published interface at anytime after its publish.
7     *
8     * NOTE: Do NOT invoke this function before the init() function is invoked by the component
9     *       framework. This publish() function can be invoked in the init() function.
10    *
11    *       interfaceName plus interfaceVersion must be UNIQUE throughout the system.
12    *
13    * interfaceName - The name of the interface. It can be different from the name of the
14    *          component.
15    * interfaceVersion - The name of the interface. It can be different from the version of the
16    *          component.
17    * commInterface - Points to the interface the producer component wants consumer
18    *          components to use to communicate with it.  This interface is retrieved by
19    *          the retrieve() function.
20    *
21    * Return:
22    *    0 - Success
```

*FIG. 2H*

```
 1    *  -n - Error code
 2    */
 3    int (*publish)(const char* interfaceName, const char* interfaceVersion,
 4                   void* commInterface);
 5    /*
 6     * remove() is used by the producer component to remove a published interface from further
 7     * uses by consumer components.
 8     *
 9     * NOTE: Do NOT invoke this function before the init() function is invoked by the component
10     *       framework. This remove() function can be invoked in the init() function.
11     *
12     * interfaceName - The name of the interface. It can be different from the name of the
13     *       component.
14     * interfaceVersion - The name of the interface. It can be different from the version of the
15     *       component.
16     * Return:
17     *   0 - Success
18     *  -n - Error code
19     */
20    int (*remove)(const char* interfaceName, const char* interfaceVersion);
21    /*
22     * retrieve() is used by the consumer components to retrieve a published interface. Each
```

*FIG. 2I*

```
 1    * invocation of this function returns the specified published interface if it exists.
 2    *
 3    * NOTE: Do NOT invoke this function before the init() function is invoked by the component
 4    *       framework. This retrieve() function can be invoked in the init() function.
 5    *
 6    * interfaceName - The name of the published interface. It can be different from the name of
 7    *       the component.
 8    * interfaceVersion - The name of the published interface. It can be different from the version
 9    *       of the component.
10    *
11    * Return:
12    *   A pointer to the interface the producer component wants consumer components to use to
13    *   communicate with it. Otherwise, a NULL pointer is returned if the specified interface is
14    *   not found.
15    */
16    void* (*retrieve)(const char* interfaceName, const char* interfaceVersion);
17
```

*FIG. 2J*

```
 1   /*------------------------------------------------------------*
 2   ** NOTIFICATION OF EVENTS                                     *
 3   **------------------------------------------------------------*
 4   ** The following functions are used to inform the registered entities when components
 5   ** started or stopped, or when an interface is published or removed.  An event is generated
 6   ** generated by the component framework when a component completely started or
 7   ** stopped. Any components that interest in those events can register with the
 8   ** component framework to be notified when those events occur.
 9   **
10   ** The component framework initializes those two members immediately after a pointer
11   ** pointer of this data structure (CompFrameworkInterface) is retrieved from a component.
12   **------------------------------------------------------------*/
13   /*
14    * addListener() registers or adds the specified listener that listens to the specified
15    *           event (evt_type).
16    * evt_type - The event the specified listener listens.
17    * componentName - The name of the component this listener belongs.
18    * componentVersion - The version of the component this listener belongs.
19    * listener - The function to be invoked when the specified event occurs.
20    * eventData - Points to the data structure containing information about the occurred event.
21    *
22    * Return:
```

*FIG. 2K*

```
1      *   0 - Success
2      *  -n - Error code
3      */
4      int (* addListener)(EventType evt_type,
5                  const char* componentName,
6                  const char* componentVersion,
7                  void (*listener)(EventDesc *eventData));
8      /*
9      * removeListener() removes the specified listener from listening to the specified event.
10     * evt_type - The event the specified listener listens.
11     * componentName - The name of the component this listener belongs.
12     * componentVersion - The version of the component this listener belongs.
13     * listener - The function to be removed or unregistered.
14     * eventData - Points to the data structure containing information about the occurred event.
15     *
16     * Return:
17     *   0 - Success
18     *  -n - Error code
19     */
20     int (* removeListener)(EventType evt_type,
21                 const char* componentName,
22                 const char* componentVersion,
```

*FIG. 2L*

```
1                    void (*listener)(EventDesc *eventData));
2    } CompFrameworkInterface;
3
4    #endif
```

*FIG. 2M*

```
1   /* The following enumeration is used to indicate the type of event. */

2   typedef enum {

3       COMPONENT_STARTED,    /* a component was started. */

4       COMPONENT_STOPPED,    /* a component was stopped. */

5       INTERFACE_ISSUED,     /* an interface was published/published. */

6       INTERFACE_REMOVED,    /* an interface was removed. */

7       COMMAND_ISSUED,       /* an administrative command was registered with the system. */

8   } EventType;

9

10  /*

11  The _EventDesc structure contains information describing the following events that are related 12   * to components and interfaces:

13   * 1) ComponentStarted - When a component is started.

14   * 2) ComponentStopped - When a component is stopped.

15   * 3) InterfaceIssued  - When an interface is published/published.

16   * 4) InterfaceRemoved - When an interface is removed.

17   */

18

19  typedef struct _EventDesc {

20          /* The name of the component/interface associated with this event.

21           * If the eventType is either COMPONENT_STARTED or COMPONENT_STOPPED, 22           * then name refers to the name of the concerned component. If
```

*FIG. 3A*

```
 1          * the eventType is either INTERFACE_ISSUED or INTERFACE_REMOVED,
 2          * then the name refers to the name of the concerned interface.
 3
 4   * If the event type is COMMAND_ISSUED, this member variable contains the
 5          * entered/published command. */
 6          char *name;
 7
 8          /* The version of the component/interface associated with this event.
 9          * If the eventType is either COMPONENT_STARTED or COMPONENT_STOPPED,
10          * then version refers to the version of the concerned component.
11          *
12          * If the eventType is either INTERFACE_ISSUED or INTERFACE_REMOVED,
13          * then the version refers to the version of the concerned interface.
14          *
15          * If the event type is COMMAND_ISSUED, this member variable contains a NULL pointer.
16          * That is, (char *)NULL. */
17          char *version;
18
19          /* The type of this event. */
20          EventType type;
21
22          /* When did this event occur? */
```

*FIG. 3B*

```
1
2          time_t whenOccurred;
3
4    } EventDesc;
5
1
```

*FIG. 3C*

```
1   /* Definitions related to message queue. These definitions are used by external entities which
2    * wish to communicate with the component framework and the running components. */
3
4   #define CONFIG_MSG_Q_KEY   12764
5   #define INCOMING_MSG_TYPE    100
6   #define OUTGOING_MSG_TYPE    200
7   #define MSG_BODY_SIZE        256
8
9   /*
10   Data structure related to message queue. This structure is used by external entities which
11   * wish to communicate with the component framework and the running components.
12   */
13
14   typedef struct _MsgBuffer {
15      long msgType;              /* Incomming msg. type. */
16      long respondMsgType;       /* Outgoing msg. type. */
17      char msgBody[MSG_BODY_SIZE];  /* E.g. StartComponent mycompo 1.2.3.4 */
18   } MsgBuffer;
     19
     19
     19
     19
     19
     19
     19
```

FIG. 4

DYNAMIC COMPOSITION AND MAINTENANCE OF APPLICATIONS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Intel Corporation, All Rights Reserved.

FIELD OF THE INVENTION

This invention relates to the field of application composition and maintenance, and, more specifically, to the dynamic composition of applications.

BACKGROUND OF THE INVENTION

Building a software application can be a very timely and tedious process. This process may consist of writing a technical specification, pseudocode, or any combination thereof. Thereafter, an application is written in a selected programming language, compiled, debugged, and executed. Modifying a software application can sometimes be just as tedious since a component must be recompiled every time it is modified.

The traditional software development process statically links needed components (functions, etc.) at link time. This means that any components that are to be modified must be modified before an application that uses the component is executed at runtime. Consequently, if the modifications are being worked on, or are incorrect, the application must be shut down until modifications to the component are complete.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A–2M contain sample code for the identification and versioning of components, lifetime management of components, communication capability of components, and event notification.

FIGS. 3A–3C contain sample code for the occurrence of events.

FIG. 4 contains sample code for component communication with external entities.

DETAILED DESCRIPTION OF THE INVENTION

In one aspect of the invention is a method to dynamically compose and maintain applications. An application is created within a component framework, where each component of the application is part of the component framework. Additionally, each component implements an integration interface. The integration interface comprises a number of methods that allow the component framework to manage the lifetime of the components, and that give the components the ability to communicate with the component framework, other components, and external entities.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

Figure 1:
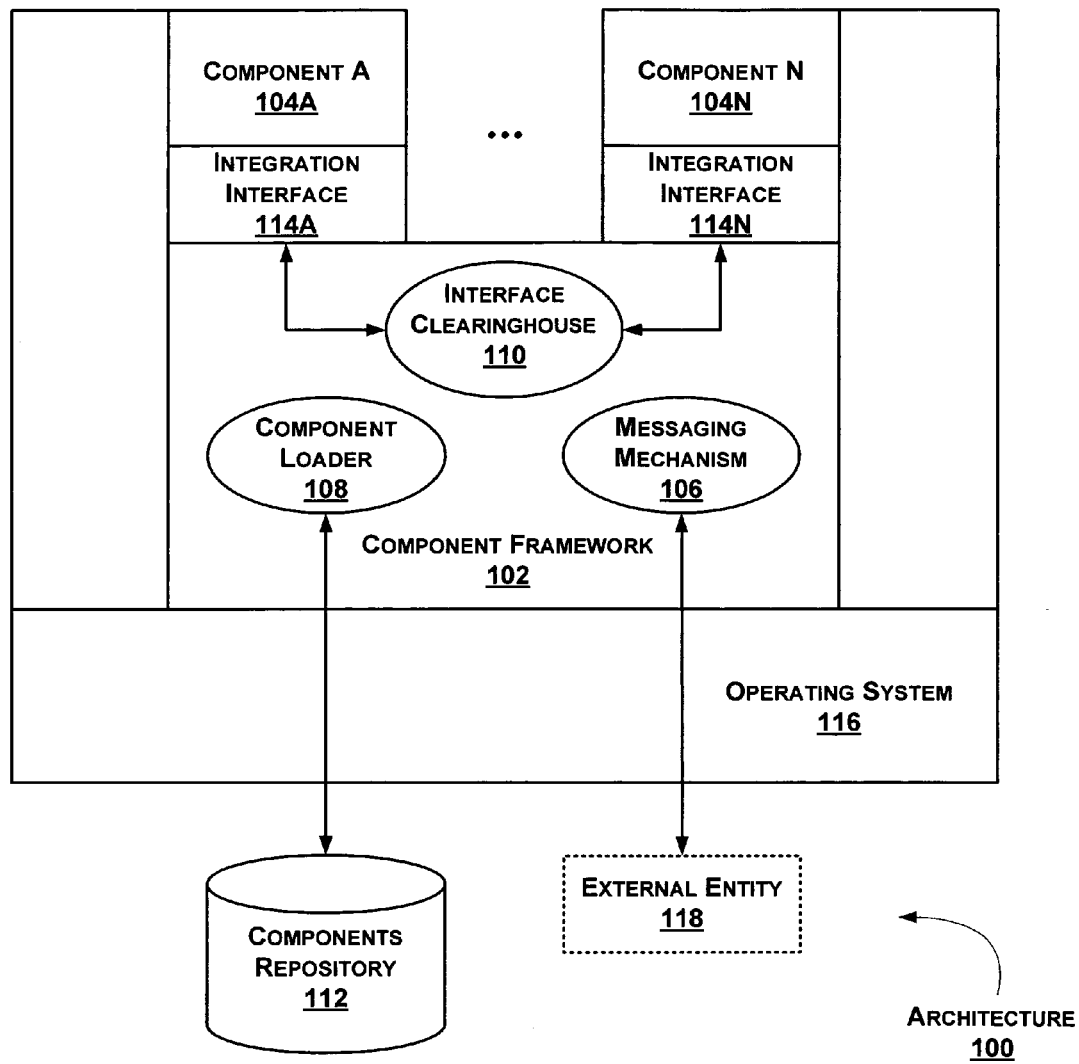
FIG. 1 is a block diagram illustrating a system architecture for implementing a dynamically composed application in accordance with embodiments of the invention.

FIG. 1 illustrates a system architecture for implementing a dynamically composed application. The architecture 100 comprises a component framework 102, one or more components 104A-N, a messaging mechanism 106, a component loader 108, an interface clearinghouse 110, and a components repository 112. Each application comprises a component framework and a set of components, and each component 104A-N is associated with a corresponding interface 114A-N.

Thus, when an application is created, it is created within a component framework 102, where each of its components 104A-N implements an integration interfaces 114A-N. Furthermore, an integration interface 114A-N comprises a number of methods that allow the component framework to manage the lifetime of its components. These are further described below.

Component

Components are atomic and comprise a set of constructs (i.e., classes in C++, functions in C, or software elements), and resources (interface for integration and communications). Atomic components must be deployable in a component framework: component A should not depend on a function in another component to be complete.

Components may be packaged using asymmetric encryption to prevent malicious tampering and to identify the makers of the components via their digital signature. The makers of the components use their private key to package the components. The makers of the components give the public key to the component framework at start-up time so that the component framework can unpack the packaged components and obtain the digital signature.

Each component 104A-N implements an integration interface 114A-N that allow its corresponding component framework 102 to manage it.

Component Framework

A component framework 102 provides a structural frame within which the set of components 104A-N operate. Its purpose is multi-fold. For one, it is responsible for loading and unloading components 104A-N at runtime. When the component framework 102 receives a command to load and link a component 104A-N from an external entity 118, such as a GUI (graphical user interface) based administrative application, the component framework loads the specified component from a source (components repository 112, persistent storage, sockets, file system, etc.), and then links the loaded components.

Transitioning Components

The component framework 102 also manages the lifetime of components by transitioning the components 104A-N from the initialization state to the destroy state. When a component 104A-N implements the integration interface 114A-N, it inherits methods of the integration interface 114A-N that allow the component framework 102 to transition the component 104A-N from state to state.

FIG. 2A is an example structure having event handlers, CompFrameworkInterface that defines these states, and these states are illustrated in FIGS. 2C–2F. The event handlers corresponding to these states are summarized below:

Initialize (FIG. 2C, lines 8–20): the component framework 102 gives a component 104A-N a chance to prepare to operate. The component 104A-N is expected to react to this call by initializing its internal data structure and by acquiring needed resources. When a running component 104A-N reacts to this state, it should be ready to perform normal operations.

Replace (FIG. 2C, line 22–FIG. 2E, line 8): the component framework 102 notifies the to-be-replaced component 104A-N that it is being replaced. The replace event handler gives the component framework 102 the interface to be given to the new component 104A-N for the purpose of transferring states. When the component framework 102 completely transfers the states of the to-be-replaced component 104A-N to the new component 104A-N, the component framework 102 delivers a stop event to the to-be-replaced component 104A-N. The component framework 102 subsequently starts the new component 104A-N.

Run (FIG. 2E, line 10–FIG. 2F line 3): the component framework 102 transitions a component 104A-N to this state when all resources are ready for the component 104A-N to use in normal operating mode.

Stop (FIG. 2F, lines 5–13): the component framework 102 gives the component 104A-N a chance to clean up or to release resources (i.e., memory, file descriptors, revoking published interfaces, etc.) before the component framework 102 destroys or unloads the component 104A-N so that the stability of the whole system is maintained. This event handler may return an error code (line 11) if the component 104A-N cannot continue normal operation.

As illustrated in FIG. 2B, the component framework 102 also communicates with loaded components 104A-N via the integration interface 114A-N. The component framework 102 can identify the components 104A-N, including their name and version, for managing the components 104A-N as follows:

getName method (FIG. 2B, lines 8–11) is used to obtain the name of the loaded component 104A-N.

getVersion method (FIG. 2B, lines 13–16) is used to obtain the version of the loaded component.

The initialize, replace, run, stop, getName, and getVersion, members are initialized by a corresponding component 104A-N.

Inter-Component Communication

The component framework 102 provides a mechanism for components 104A-N to register interfaces that are used by other components 104A-N for inter-component communication. As illustrated in FIGS. 2G–2J, components 104A-N use the following event handlers of their corresponding integration interface 114A-N for registering their interfaces for inter-component communication:

Publish method (FIG. 2H, line 4–FIG. 2I, line 4) for the loaded component 104A-N to publish data and events.

Remove method (FIG. 2I, lines 6–20) allows a loaded component 104A-N to remove the previously published interfaces.

Retrieve method (FIG. 2I, line 22–2J, line 16) for the loaded component 104A-N to subscribe data and events.

Events

The component framework 102 may also inform registered components of the occurrence of certain events, such as when components 104A-N started or stopped, or when an interface is published or removed. As illustrated in FIGS. 2K–2M, any components 104A-N that are interested in those events can register with the component framework to be notified of when those events occur.

addListener method (FIG. 2K, line 14–FIG. 2L, line 7) allows a loaded component 104A-N to register an event handler or a listener for the specified event. When the specified event occurs, the given listener (event handler) is invoked.

removeListener method (FIG. 2L, line 9–FIG. 2M, line 1) allows a loaded component 104A-N to de-register (remove) the previously registered event handlers or listeners.

These members are initialized by the component framework before the initialize method is called.

These events are illustrated in FIGS. 3A–3C, and are summarized below:

Component Started (FIG. 3A, line 3) event occurs when the component framework 102 starts a component 104A-N.

Component Stopped (FIG. 3A, line 4) event occurs when the component framework 102 stops or replaces a component 104A-N.

Interface Issued (FIG. 3A, line 5) event occurs when a component 104A-N publishes an interface.

Interface Removed (FIG. 3A, line 6) event occurs when a component 104A-N removes a previously published interface.

Command Issued (FIG. 3A, line 7) event occurs when a component 104A-N registers an administrative command.

Messaging Mechanism

Referring back to FIG. 1, the component framework 102 must support several levels of communication, including communication with external entities 118 so that various commands can be received. These commands include those affecting the lifetime of components 104A-N, such as the starting and stopping of components. Other commands, such as replacing a buggy with a good component 104A-N, shutting down the component framework 102, etc., are also supported.

A messaging mechanism 106 in embodiments of the invention provides the capability to listen to external entities 118 for commands. The mechanism, also known as dynamic commands facilitator (DCF) provides components 104A-N a way to dynamically register needed administrative commands and associated callback functions at runtime. When the DCF receives entered commands, the DCF forwards the entered commands to the components 104A-N that own the commands via the given callback functions. FIG. 4 illustrates definitions that external entities 118 can use to communicate with the component framework 102 and running components 104A-N.

The messaging mechanism 106 can be implemented via a message queue, sockets, or any other IPC (Interprocess Communication) mechanism.

Component Loader

A component loader 108 is responsible for loading the specified components 104A-N from a source such as a file system or a components repository 112 (see below). After the specified components 104A-N are loaded, they are linked into the running application. The component loader 108 should be capable of unpacking a packaged component 104A-N using the public key, which is given by the user at the start-up of the component framework 102. The component loader 108 should also be capable of loading packaged components 104A-N from the specified location, such as permanent storage, or a network connection.

The component loader can also contact a trusted central host in a network to query and to retrieve components. In addition, if the component loader is configured with references to its peers, such as other component loaders in a network, the component loader will query its peers and retrieve the needed components from the peers who have the fastest response time. If network connection problems occur during transferring of components, the component loader will try to retrieve the needed components from other peers regardless of the response time.

Component Repository

The component repository 112 holds the packaged components 104A-N. When the component loader 108 needs to load a component 104A-N, the component loader 108 loads the packaged component 104A-N using the given public key to decrypt the packaged component 104A-N and to verify the digital signature of the maker of the component 104A-N in effect.

Interface Clearinghouse

The component framework 102 should provide a well-known place to collect, classify and distribute interfaces. This place is known as the interface clearinghouse 110. The purpose of the interface clearinghouse 110 is to provide a mechanism that the components 104A-N can use to publish and remove interfaces.

If a component 104A-N wishes to share its internal data and events with other components 104A-N, it publishes its interfaces to the interface clearinghouse 110. The components 104A-N that wish to consume the published data and events come to the interface clearinghouse 110 to retrieve to the published interfaces.

The interface clearinghouse 110 should not impose any wire protocols. The components 104A-N agree with each other on suitable wire protocols, giving the components 104A-N the flexibility in creating new and suitable wire protocols.

Communication Between Component Framework and Components

The component framework 102 for a given application loads and links a specified component 104A-N when the application receives a start command. The application first locates the specified shared library that contains the component 104A-N, using, for instance, the following command:

Start <Component-Package-Name> <Interface-Accessor>

Component-Package-Name is the name of the encrypted package that contains the component 104A-N and associated resources. Interface-Accessor is the function name that is used by the component framework to retrieve an integration interface from the component 104A-N being loaded. When that function name is invoked by the component framework 102, that function must return an integration interface 114A-N. The external entity 118 that starts that component 104A-N must specify that function name (Interface-Accessor) so that the component framework can initiate a communication session to retrieve an integration interface from the component.

The component framework 102 loads the found shared library comprising the specified component 104A-N and then retrieves the integration interface 114A-N via an interface-accessor as specified by the external entity that starts a component. For example:

void* <interface-accessor-name>(void) { . . . }

The interface accessor then returns a pointer to an instance of the integration interface 114A-N. The pointer stays valid throughout the life of the component 104A-N.

The component framework 102 can then use the retrieved integration interface 114A-N to transition the loaded and linked component 104A-N to the initialize state by invoking the initialization method, and transitioning the linked component 104A-N to the run state by invoking the run method. If the running component 104A-N wishes to publish data and events for other components 104A-N to retrieve, the running component 104A-N invokes its publish method. If the component wishes to consume the published data and events, it invokes its retrieve method. If a running component wishes to receive events, the running component invokes its addListener method.

The component framework 102 unloads the specified component 104A-N when the application receives a stop command for the component 104A-N of a given name and version. Upon receiving the stop command, the application queries all components 104A-N for their name and version. The first component 104A-N that has the specified component name and version is terminated. The component framework 102 gives the specified component 104A-N an opportunity to perform house cleaning by transitioning that component 104A-N to the stop state.

The application then exits when it receives an exit command. The application terminates all components 104A-N before it exits, in the same manner as if the application receives a stop command for all components 104A-N.

Figure 5:
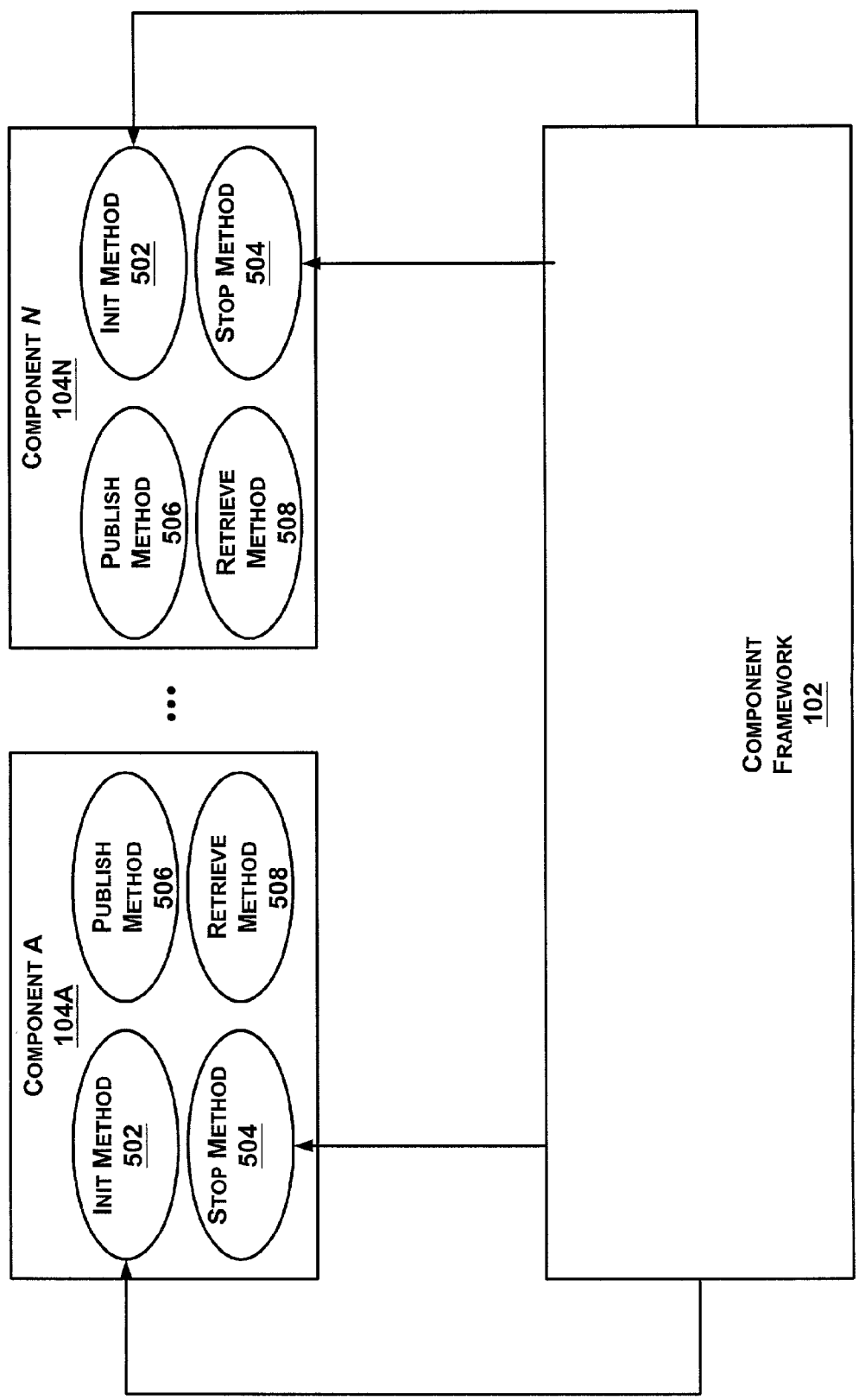
FIG. 5 is a block diagram illustrating the interaction between a component framework and components in accordance with embodiments of the invention.

FIG. 5 illustrates the interaction between the component framework 102 and the set of components 104A-N. When a component 104A-N is loaded by the component framework 102, the component framework 102 invokes the initialize method 502 of the loaded component. When a running component 104A-N needs to be unloaded from the component framework 102, the component framework 102 invokes the stop method 504 of the loaded component 104A-N.

If the running component 104A-N wishes to publish data and events for other components 104A-N to subscribe to, the running component invokes the publish method 506 of the loaded component 104A-N. If a component 104A-N wishes to consume published data and events, it invokes the retrieve method 508 of the loaded component 104A-N.

Communication Between Components

Figure 6:
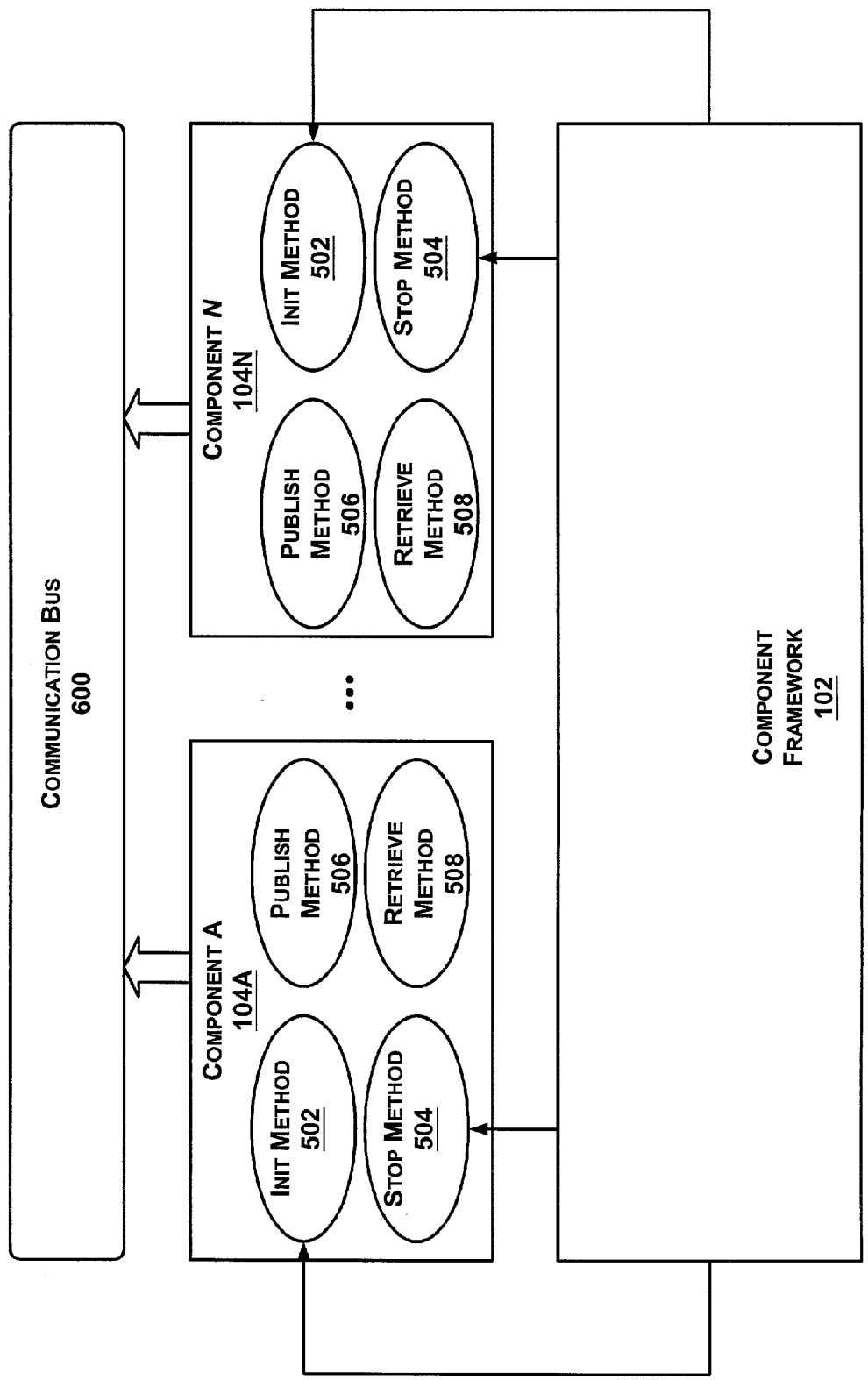
FIG. 6 is a block diagram illustrating inter-component communication in accordance with embodiments of the invention.

As illustrated in FIG. 6, after at least one call to both the publish and retrieve methods, a communication bus 600 for inter-component communication is established, allowing components 104A-N to communicate with each other without intervention from the component framework 102.

The components 104A-N themselves define a suitable wire protocol and interface. Components 104A-N use an interface to talk to each other, and the wire protocol is the language used to describe the intention of the components 104A-N.

The components 104A-N that produce data and/or events publish an interface via the interface clearinghouse 110 of the component framework 102. The components 104A-N that consume data and/or events subscribe to those data and/or events via the interface clearinghouse 110. As stated above, when there exists at least one call to both publish and retrieve, a communication bus 600 is established.

When a component 104A-N wishes to communicate with one or more other components 104A-N, the consumer component invokes the retrieve method 508 of the integration interface 114A-N specifying an interface of the component 104A-N. The component framework 102 gives the specified interface to the component 104A-N if the requested interface exists. The existence of an interface only occurs when that interface has been published by a component 104A-N. The consumer component 104A-N uses the addListener method to notify the producer component 104A-N of the interested events.

Communications between components 104A-N can be based on events so that traffic is minimized. The components only receive the specified events from their peers and the component framework. For example, when an event occurs within a particular component and no other components register to receive that event, the occurred event will not be broadcasted. This constraint applies to all events and components. The components 104A-N must notify each other when any of the components 104A-N want to terminate a communication session. Furthermore, components 104A-N should be able to sense the abnormal termination of a communication session and react to it accordingly.

Rapid Composition of Applications

Using the described methods above, an application is capable of loading and linking a component at runtime. For example, assume an application comprises component A, B, C, and D, and the application is executing without component B because component B is being upgraded. Assume also that component B is packaged in Component-Package-B. When component B is ready, it can be loaded and linked to the other components as described below.

The application receives a start command from an external entity, which provides the application with the interface accessor function, IA_B. The component framework for the application loads and links a specified component. The application first locates the specified shared library that contains the component, using, for instance, the following command:

Start <Component-Package-B> <IA_B>

The component framework loads the found shared library comprising the specified component and then uses the interface accessor function to retrieve the integration interface by invoking, for example, void* <IA_B >(void) {...}. The interface accessor then returns a pointer to an instance of the integration interface.

The component framework can then use the retrieved integration interface to transition the loaded and linked Component B to the initialize state by invoking the initialization method. Component B can then be utilized by the application.

Dynamic Maintenance of Applications

A defective and/or an obsolete component can be replaced with a new component at runtime. The user (administrator, technical support staff, etc.) issues a replace component command to the component framework. The component framework notifies the running component of the replacement intention via the replace method of the integration interface. The replace method returns the state of the running component to be transferred to the new component. When the transferring of state is complete, the component framework stops the running component and starts the new component.

The user starts a diagnostic component. The component examines the state of all other running components. If any component is found to be not in a stable state, the diagnostic component issues a command to replace that faulty component. If an updated component is not found in the local component repository, the diagnostic component can contact a trusted central host to query and to retrieve an updated component to replace the faulty component. The retrieved updated component package shall be stored in the local component repository.

For example, an application that is capable of dynamically loading and linking components uses a load balancing algorithm. Suppose, however, that a user wants to use his own load balancing algorithm. A component comprising the user's load balancing algorithm is developed, for instance, in the C language.

The component is then compiled into a shared library. That shared library is then packaged using a private key whose associated public key is already given to the component framework. A command is then issued to the component framework to load and link the component to the application. The application then delegates the load balancing task to the dynamically loaded and linked component. This delegation is made until the application is issued a command instructing it to use the original load balancing algorithm.

Method

Figure 7:
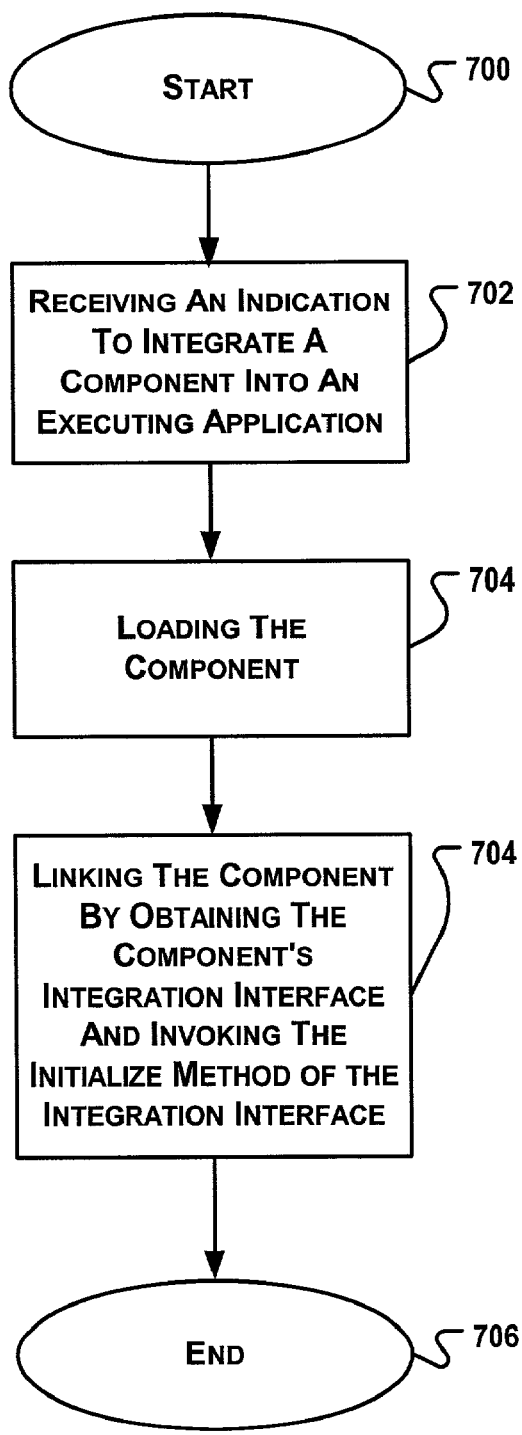
FIG. 7 is a flowchart illustrating a method to dynamically compose and maintain an application in accordance with general embodiments of the invention.

FIG. 7 is a flowchart illustrating a method for dynamically composing and maintaining an application in accordance with embodiments of the invention. The flowchart begins at block 700 and continues to block 702 where an indication to integrate a component into an executing application is received. At block 704, the component is loaded, and at block 706, the component is linked by obtaining the component's integration interface and invoking the initialize method of the integration interface. The method ends at block 706.

CONCLUSION

Thus, an invention has been described for composing or maintaining an application at runtime without shutting down the running component framework.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for dynamically composing and maintaining applications over a computer architecture comprising:
receiving an indication to dynamically integrate a component into an executing application;
loading the component from a source;
linking the component to the application in runtime by obtaining an integration interface associated with the component, the integration interface providing methods for managing the component, and by initializing the component by invoking an initialize method of the integration interface; and
establishing an inter-component communication between the component and existing components by
publishing first information associated with the loaded component for the existing components,
subscribing second information associated with the existing components by the loaded component, and
removing previously published interfaces, the previously published interfaces are removed by the loaded component.

2. The method of claim 1,
wherein the publishing of the first information is performed by invoking a publish method of the integration interface, the first information including publishing one or more of data, events, and one or more interfaces the existing components.

3. The method of claim 2,
wherein the subscribing of the second information is performed by invoking a retrieve method of the integration interface, the subscribing of the second information including retrieving one or more interfaces from the existing components, the subscribing of the second information further including the loaded component communicating with the existing component via the retrieved one or more interfaces.

4. The method of claim 1, further comprising:
examining the existing components to determine a defective component that is to be replaced; and
replacing the defective component with the loaded component.

5. The method of claim 1, wherein the source comprises one or more of a file system and a component repository.

6. The method of claim 5, wherein the file system and the component repository reside in a network.

7. A system comprising:
a storage device;
a client computer system coupled with the storage device; and
a server computer system coupled with the client computer system, the server computer system including a component framework to dynamically compose and maintain applications over a computer architecture, the component framework is further to receive an indication to dynamically integrate a component into an existing application,
load the component from a source, the source including one or more of a file system and a component repository,
link the component to the application in runtime by obtaining an integration interface associated with the component, the integration interface providing methods for managing the component, and by initializing the component by invoking an initialize method of the integration interface, and
establish an inter-component communication between the component and existing components by publishing first information associated with the loaded component for the existing components,
subscribing second information associated with the existing components by the loaded component, and
removing previously published interfaces, the previously published interfaces are removed by the loaded component.

8. The system of claim 7, wherein the inter-component communication is established via a communication bus.

9. The system of claim 7, wherein the component framework is further to:
examine the existing components to determine a defective component that is to be replaced; and
replace the defective component with the loaded component.

10. A machine-readable medium having instructions executed by a machine to:
receive an indication to dynamically integrate a component into an executing application;
load the component from the source;
link the component to the application in runtime by obtaining the component's integration interface, the integration interface providing methods for managing the component, and by initializing the component by invoking an initialize method of the integration interface; and
establish an inter-component communication between the component and existing components by publishing first information associated with the loaded component for the existing components,
subscribing second information associated with the existing components by the loaded component, and
removing previously published interfaces, the previously published interfaces are removed by the loaded component.

11. The machine-readable medium of claim 10, wherein the publishing of the first information is performed by invoking a publish method of the integration interface, the first information including publishing one or more of data, events, and one or more interfaces to the existing components; and storing the one or more interfaces in an interface clearinghouse.

12. The machine-readable medium of claim 11, wherein the subscribing of the second information is performed by invoking a retrieve method of the integration interface, the subscribing of the second information including retrieving from the existing components, the subscribing of the second information further including the loaded component communicating with the existing components via the retrieved one or more interfaces.

13. A machine-readable medium of claim 10, wherein the instructions are executed by the machine to:
  examine the existing components to determine a defective component that is replaced; and
  replace the defective component with the loaded component.

* * * * *